July 5, 1932.  F. MUHLENBRUCH  1,866,318
SPROCKET CHAIN
Filed March 10, 1930
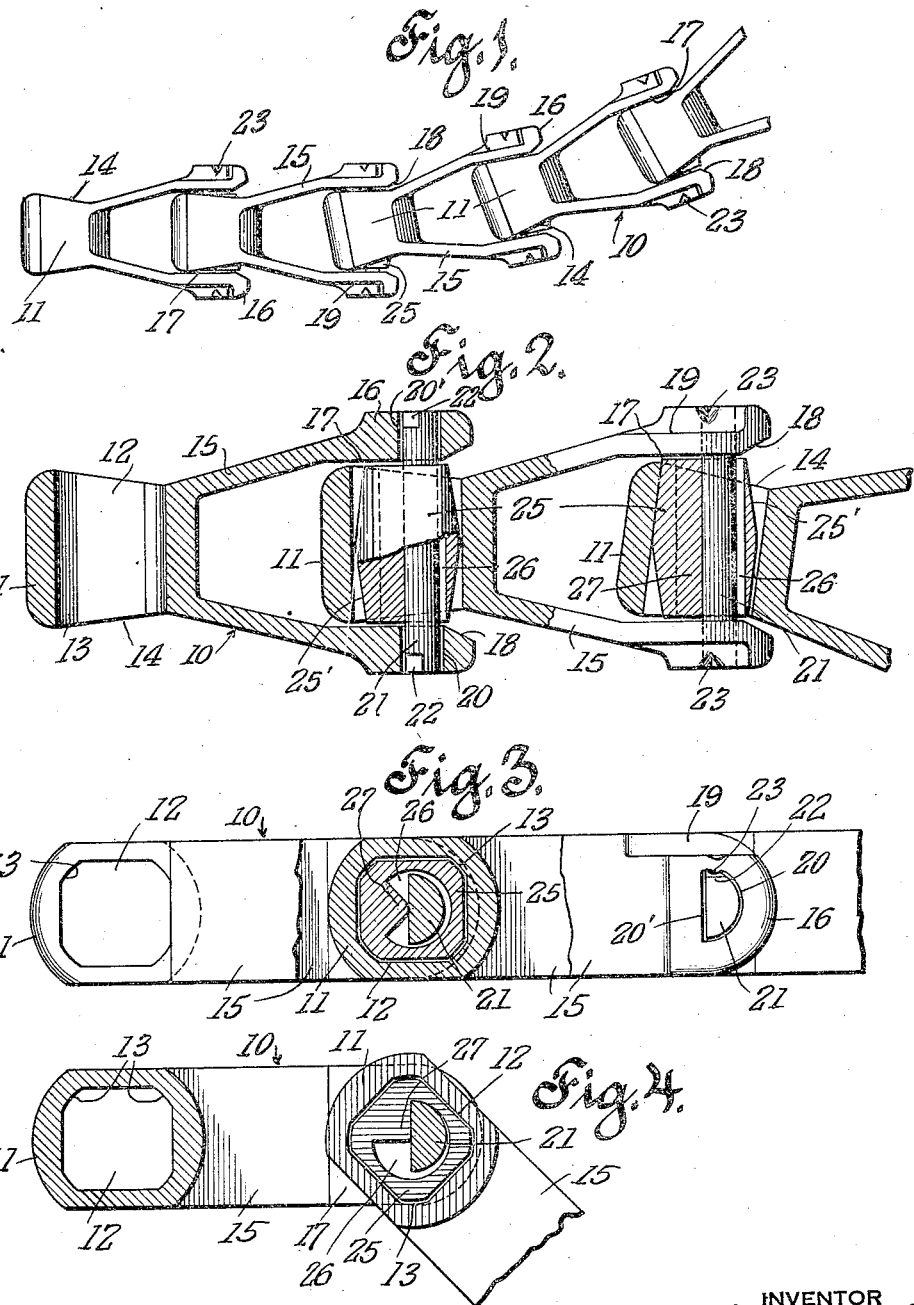
INVENTOR
Fred Muhlenbruch
BY
Percy Freeman
ATTORNEY Patented July 5, 1932

1,866,318

UNITED STATES PATENT OFFICE

FRED MUHLENBRUCH, OF BRONX, NEW YORK

SPROCKET CHAIN

Application filed March 10, 1930. Serial No. 434,529.

This invention relates to link belts as used for chain conveyors and similar purposes where a strength and flexibility are required.

Ordinary chain link belts, when used on straight runs, act satisfactorily for their purpose, but when it is necessary to deviate laterally, as when the driving, driven and idler sprockets are not in alinement, difficulty is encountered and an excessive strain is placed on the links for which they are not designed.

It is therefore an object of this invention to provide a link having a sleeve and connecting pin so shaped and arranged as to permit of very considerable edgewise yielding without weakening, distortion or damage.

In the use of such belts, difficulty has also been encountered in having the links readily and easily fall away from or disengage in teeth of the sprockets over which the chain is trained.

It is therefore a further object of the invention to provide in such a chain means to cause the links to expand, so to speak, as the chain travels over the sprockets so that the sprocket teeth are easily and readily withdrawn from the chain links without binding or grinding.

A further feature is in the provision of a chain link belt composed of only three distinct elements, all of which are capable of being inexpensively constructed, easily assembled and suited for long wear and heavy duty.

These meritorious objects, together with others of analogous nature, are attained by the novel design, construction, and combination of parts hereafter described and illustrated in the annexed drawing, constituting a component of this disclosure, and in which:

Fig. 1 is a perspective view of a series of connected links, made in conformity with the invention, the chain so produced illustrating the edge or lateral action possible.

Fig. 2 is a partial plan, partial longitudinal sectional view of the links showing the connecting means.

Fig. 3 is an edge view of the same when extended straight.

Fig. 4 is a similar view but showing the extreme angular position assumed by the links when the chain is bent.

The links of the chain, generally designated by the numeral 10, each consist of a flattened elliptical element containing a transverse quadrilateral opening 12 having rounded internal corners 13, the length of the opening being in the direction of the length of the link and slightly in excess of its width.

The sides of the element 11 are formed convergently, as at 14, and extending from the convergent sides, at points registering with the inner end of the opening, are opposed arms 15, angularly diverging and terminating in pads 16, their parallel inner surfaces 17 being bevelled outwardly, as at 18, at their extremities, these elements constituting a fork.

The space between the pad surfaces 17 is slightly in excess of the width of the elements 11 to permit them to enter freely therebetween, as will be seen.

The outer surfaces of the pads 16 are formed in parallel and in their outer edge, on one side of each, are recesses 19.

Formed through the pads are semi-circular openings 20 their straight portions 20' being directed towards the opening 12.

These openings are receptive of half round bar pins 21 of such length as to extend flush at both ends with the outer surfaces of the pads 16.

These pins have flats 22 on one of their edges adjacent the recesses 19, the thin bottom walls of which are adapted to be indented, as at 23, to engage the flats 22, preventing the pin from endwise movement after final assembly, as will be readily understood.

Freely mounted on the pins are sleeves 25, equal in length to the widest portions of the elements 11, these sleeves freely moving in the openings 12, which they approximate in cross sectional shape.

The sleeves are barrel shaped, that is, are tapered from the center of their lengths, in both directions to their ends, as at 25', and contain circular openings 26 into which, from the rear sides, extend ridges 27, of substantially right angular cross section, the inner edges of these ridges making contact with the flattened portions of the pins 21, along the center of their lengths.

It will be noticed that there is considerable clearance between the semi-circular portion of pin 21 and the corresponding surface of the sleeve 25, this clearance allowing for longitudinal movement of the links with respect to each other to enable the links to readily and easily disengage the sprocket teeth and thus preventing "drag."

From the foregoing, it will be seen that each link may rock sidewise on the sleeve contained therein, to the limit of their bevelled surfaces, thus permitting the chain to be bent laterally within such reasonable limits as may be desired, see Figs. 1 and 2.

Although the sleeve 25 is prevented from any material rotation in the opening 12, the bar pin 21 freely rocks on the ridge 27, thus enabling the chain to bend flatwise up to the limit of the angular sides of the ledge, as will be readily seen in Fig. 4.

As changes of construction could be made within the scope of the invention, it is intended that all matter contained in the foregoing description or shown in the accompanying drawing shall be interpreted as illustrative and not in a limiting sense.

Having thus described my invention, what I claim as new and desire to secure by Letters Patent, is:

1. In a link belt chain, a link having a flattened oval head at one end, the side edges of said head being convergently inclined, said head containing a transverse polygonal opening, a pair of opposed divergent arms constituting a fork extending from the narrow side of said head, pads on the ends of said arms, said pads having registering semi-circular openings, a semi-circular bar pin fixed in the opening of said pads to engage the head of the next link, and a barrel shaped sleeve suited to the opening in the head, and means in said sleeve to rock longitudinally on said pin.

2. In a link belt chain, a series of links having transverse quadrilateral openings in one end element, forks extending therefrom to receive the corresponding element of the adjacent link, a bar pin passed through the ends of said forks and opening in the next end element, a barrel shaped sleeve interjacent the opening and pin, and an angular ridge in the sleeve extending longitudinally thereof to contact said pin.

3. In a link belt chain, a series of links having heads at one end and forks carrying pads at the other end, said heads having convergent side edges and said forks being spread to permit entrance of the next link head between said pads, said heads containing transverse quadrilateral openings, sleeves conforming to the openings in said heads, said sleeves being bevelled from their centers to their ends and having an internal longitudinal ridge of angular cross section, and a bar pin of semi-circular cross section fixed in said pads to extend therebetween and on which said sleeves are mounted, said ridges contacting with the flattened portions of said pins.

4. In a link belt chain, a link having a head at one end and a fork at the other receptive of the head of the next adjacent link, said head having a polygonal opening, a sleeve having a central portion fitting the opening, said sleeve tapering from the center to the ends to rock freely in the opening, an inreaching angular ridge in said sleeve extending lengthwise along one side, a bar pin of semi-circular cross section passing through the ends of said fork to engage said ridge whereby the sleeve may rock on the pin, and means to confine said pin in the forks.

Signed at New York, in the county and State of New York, this 25th day of February, 1930.

FRED MUHLENBRUCH.